US007042346B2

(12) United States Patent
Paulsen

(10) Patent No.: US 7,042,346 B2
(45) Date of Patent: May 9, 2006

(54) RADIO FREQUENCY IDENTIFICATION PARTS VERIFICATION SYSTEM AND METHOD FOR USING SAME

(76) Inventor: Gaige Bradley Paulsen, 11654 Plaza America Dr., Suite 214, Rest, VA (US) 20190

( * ) Notice: Subject to any disclaimer, the term of this patent is extended or adjusted under 35 U.S.C. 154(b) by 77 days.

(21) Appl. No.: 10/639,889

(22) Filed: Aug. 12, 2003

(65) Prior Publication Data

US 2005/0035852 A1 Feb. 17, 2005

(51) Int. Cl.
*B60Q 1/00* (2006.01)

(52) U.S. Cl. ........................ 340/438; 340/572.1; 701/1

(58) Field of Classification Search ................ 340/438, 340/572.1–572.9, 568.1; 701/1, 102
See application file for complete search history.

(56) References Cited

U.S. PATENT DOCUMENTS

| | | | | |
|---|---|---|---|---|
| 5,444,223 | A * | 8/1995 | Blama | 235/435 |
| 5,963,134 | A | 10/1999 | Bowers et al. | 340/572.1 |
| 5,991,673 | A * | 11/1999 | Koopman et al. | 701/32 |
| 5,995,898 | A | 11/1999 | Tuttle | 701/102 |
| 6,091,319 | A | 7/2000 | Black et al. | 340/10.2 |
| 6,112,152 | A * | 8/2000 | Tuttle | 701/115 |
| 6,195,006 | B1 | 2/2001 | Bowers et al. | 340/572.1 |
| 6,236,911 | B1 * | 5/2001 | Kruger | 701/1 |
| 6,265,962 | B1 | 7/2001 | Black et al. | 340/10.2 |
| 6,317,026 | B1 * | 11/2001 | Brodine | 340/5.8 |
| 6,354,493 | B1 | 3/2002 | Mon | 235/380 |
| 2003/0193398 | A1 * | 10/2003 | Geber et al. | 340/568.1 |
| 2004/0075559 | A1 * | 4/2004 | Brodine | 340/527.1 |

* cited by examiner

*Primary Examiner*—Phung T. Nguyen
(74) *Attorney, Agent, or Firm*—Fried, Frank, Harris, Shriver & Jacobson LLP

(57) ABSTRACT

A system and method for collecting data relating to the parts of a vehicle and using such data to determine if the vehicle can be operated. The system entails the deployment of a plurality of radio frequency identification tags on or within various parts of the vehicle that are capable of issuing radio frequency signals containing data related to each corresponding part. A radio frequency transceiver capable of interfacing with and receiving data stored within each tag operates in conjunction with a central processor unit capable of analyzing the data from each tag and determining whether the vehicle needs parts to be replaced or can be operated with its existing set of parts.

27 Claims, 8 Drawing Sheets

RADIO FREQUENCY IDENTIFICATION PARTS VERIFICATION SYSTEM AND METHOD FOR USING SAME

FIELD OF THE INVENTION

The present invention relates to the field of vehicle parts verification systems using radio frequency identification ("RFID"). The present invention can verify the existence and appropriateness of the parts that are in a vehicle at a certain time, taking into account each part's longevity, installation date, and expiration period. Using RFID technology, whereby small, inexpensive RFID tags are placed on, or embedded in, parts for a particular vehicle, the present invention can eliminate costly alternative mechanisms. The relatively inexpensive RFID tags can also be affixed to replacement parts without requiring expensive installation or connections to corresponding monitoring equipment, thereby eliminating the failure potential of the additional devices.

BACKGROUND OF THE INVENTION

Vehicles, particularly automobiles, are composed of thousands of parts and components, some replaceable, stationary, movable and/or critical to the operation of the vehicle. Keeping track of the existence and/or status of thousands of parts is not only a complex task, but virtually impossible with currently available systems. For example, a typical automobile comprises approximately 14,000 primary components that can be further divided into additional parts that form the structural and mechanical subsystems of the automobile. Because of the vast number of parts and systems involved, and the importance of maintaining and servicing vehicles, particularly fleets of vehicles used by businesses, the inventorying and managing of such parts has become more and more important.

Taking inventory of any type of article is a time-consuming and difficult task that must be done in all industries. To simplify the inventory process, many systems have been developed that use bar codes and graphic readers to track certain systems and parts. However, these systems, while an improvement over previous systems, suffer from significant limitations as well, including a line-of-sight requirement for accurate readings and one way data transfer capabilities that are limited to the transmission of small amounts of data. These existing systems also typically require that all associated data be maintained and updated in a database system that is not attached to the vehicle. While vehicles continue to utilize more sophisticated computer control systems that include the ability to store certain amounts of data, such systems are generally limited to monitoring the electrical harness, the engine and fluids.

In contrast to prior art systems, since the preferred embodiment of the present invention can be utilized with virtually any part of the vehicle and uses storage located inside the vehicle that can be updated automatically through remote transmission, the data associated with any critical part of the vehicle is always up-to-date, accurate, and immediately available. For fleet applications, the present invention may also synchronize data stored in the on-board systems with an external database, but generally the vehicle itself stores all of its own status data and may be queried whenever the vehicle is present.

The preferred embodiment of the present invention utilizes radio frequency identification ("RFID") technology. A basic prior art RFID system consists of three components:

(1) an antenna or coil; (2) a transceiver (with decoder); and (3) a transponder (RFID tag) electronically programmed with unique information. The antenna emits radio signals to activate the RFID tag and can read and write data to the RFID tag. Antennas are the conduits between the tag and the transceiver that control the system's data acquisition and communication.

Some inventorying systems, such as those utilized in libraries, have sought to take advantage of RFID technology by attaching RFID tags to each article to be inventoried and tracked. As such, the RFID tag stores important data concerning a particular article, such as a book, and the RFID reader or transceiver decodes the RFID tag by scanning it at a particular frequency so as to receive the stored data associated with the RFID tag. For example, in U.S. Pat. No. 5,963,134 and U.S. Pat. No. 6,195,006 (a continuation of the '134 patent), an inventory system is disclosed that uses articles with RFID tags which have unique identifiers or serial numbers for identification of books in a library setting. Specifically, the '134 patent envisions a library inventory control system using RFID technology whereby books are tracked from checkout to check-in. However, neither patent discloses how this system could be used in a more complex or complicated environment, such as an automobile, to track and potentially control the use of thousands of replaceable and movable parts.

In the context of vehicle applications, U.S. Pat. Nos. 6,112,152 and 5,995,898 disclose a system comprising an on-board computer and a wireless transponder device coupled to the on-board computer that can receive information from a variety of internal RFID transponders located throughout an automobile, or from remote transponders positioned at various external points such as gas stations, service centers, and dealerships. However, this system only functions to monitor the state of certain systems within the automobile, much like the typical on-board computer system noted above, it does not verify the specific parts of the automobile or allow for tracking or inventorying of particular parts in the automobile.

U.S. Pat. No. 6,265,962, a continuation of U.S. Pat. No. 6,091,319, discloses a method for resolving signal collisions between multiple RFID transponders in a field. In particular, the invention describes a system whereby multiple RFID transponders and interrogators are able to operate in the same field without a resulting collision of signals. The system does not suggest how such RFID technology can be used to manage and verify parts in particular vehicles.

Likewise, U.S. Pat. No. 6,354,493 discloses a system and method for finding a specific RFID tagged article located in plurality of RFID tagged articles. This system addresses issues related to finding misplaced items in large inventories. It does not offer a solution for tracking thousands of parts in a vehicle in order to promote the correct and safe operation of that vehicle.

The present invention can be further distinguished from the prior art in three important ways. First, the present invention increases the safety of the vehicles utilizing the system. Safety is an ongoing concern in all aspects of life, and the automobile is no exception, especially with respect to the replacement of damaged or warn parts. Though many manufacturers use warning labels instructing users to replace damaged or warn parts only with the appropriate equivalent parts, there is no means of verifying such compliance. The preferred embodiment of the present invention enables compliance verification.

Second, the preferred embodiment of the present invention enables the authenticity of parts in a particular vehicle to be checked. Vehicle service centers could utilize an authenticity check to identify potential incompatibility issues caused by the use of non-authentic parts. Potential purchasers of used vehicles could verify the authenticity of the parts on such vehicle to make sure all of the parts have been approved by the manufacturer of the vehicle.

Third, the preferred embodiment of the present invention significantly enhances vehicle owner convenience. For example, modern automobiles have many parts that require periodic replacement. Often, automobile manufacturers create re-settable time periods to warn operators, though a dashboard warning light, to change the oil or perform "periodic maintenance," but few, if any, provide a mechanism for warning users that it is time for them to replace parts that have a limited lifespan, such as oil and air filters, belts, hoses, etc. One past obstacle to providing such warnings has been the difficultly associated with determining when the user has changed a part, thereby initiating the reset of any counter related to that part. The present invention, through constant verification, provides such a capability, enabling more accurate information to be provided to the user. These features are not contemplated or anticipated by the prior art.

SUMMARY OF THE INVENTION

The present invention involves a system and method for collecting data relating to the parts of a vehicle and using such data to determine if the vehicle can be operated. The system entails the deployment of a plurality of radio frequency identification tags on or within various parts of the vehicle that are capable of issuing radio frequency signals containing data related to each corresponding part. A radio frequency transceiver capable of interfacing with and receiving data stored within each tag operates in conjunction with a central processor unit capable of analyzing the data from each tag and determining whether the vehicle needs parts to be replaced or can be operated with its existing set of parts.

DETAILED DESCRIPTION OF THE PREFERRED EMBODIMENT

The present invention provides a system and method for gathering data concerning parts of vehicles, or any complex structure comprised of multiple mechanical parts, such as a locomotive, diesel engine, etc., and using that data to determine whether the parts are the appropriate parts for use in that structure and for indicating when parts need to be replaced so as to increase the operational safety of the structure. The system is referred to herein as the PVS (Parts Verification System). The PVS uses RFID technology to initially associate data with different parts and to facilitate the identification of those parts in the future. In particular, small, relatively inexpensive RFID tags are placed on, or embedded in, various different parts of a vehicle or structure.

In the context of a vehicle, although a large number of different parts could be labeled with RFID tags, the preferred embodiment of the present invention is primarily focused on the labeling of replaceable, disposable parts (such as oil and air filters, windshield wipers, etc.), as well as other parts that do not include any electronic components, power supplies, or require some form of pre-existing communicative connection to other systems of the vehicle, such as hoods, trunks and body side panels. For such parts, adding a conventional electronic connection to them to verify their existence and authenticity is impractical. Rather than attempt to label and verify such parts in this manner, the preferred embodiment of the present invention replaces such costly mechanisms with RFID tags that can be affixed to replacement parts for relatively little cost and without expensive installation and without requiring any form of physical connection to another system within the vehicle.

Figure 1:
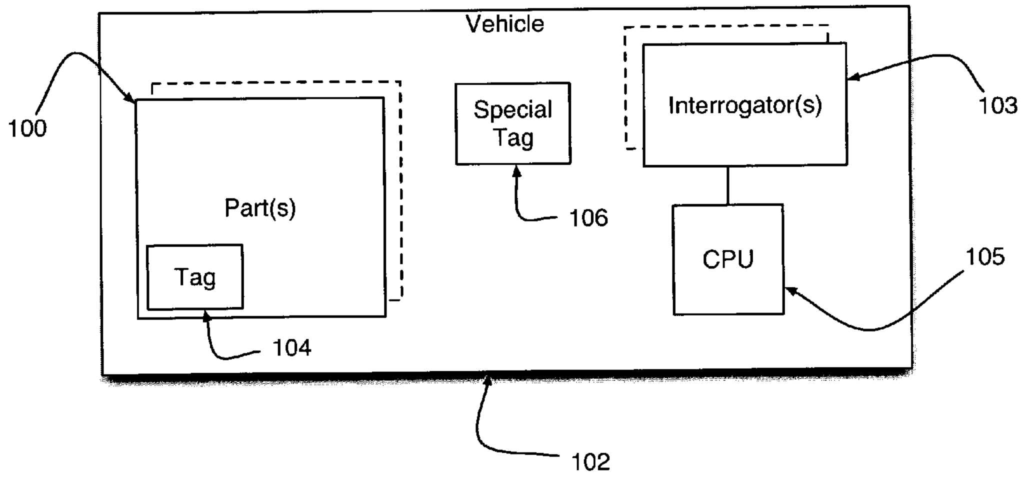
FIG. 1 is a block diagram illustrating the Parts Verification System of the preferred embodiment of the present invention.

Referring now to FIG. 1, in accordance with the preferred embodiment of the present invention, each part 100 of the vehicle 102 to be monitored must include a RFID tag 104. These RFID tags 104 must be appropriate for the environment in which the parts 100 exist. For example, parts 100 located around the engine or drive train would need to be resistant to temperature, dirt, vibration and oil, while other parts 100, such as side panels, may only need to be resistant to temperature and vibration. The RFID tag 104 and part 100 manufacturers would be responsible for determining the appropriate level of resistance and the location of the RFID tags 104 on the parts 100.

Likewise, a manufacturer would have to decide between using active or passive RFID tags 104. Active RFID tags are powered by an internal battery and can be rewritten and/or modified. The memory of an active RFID tag can be up to 1 MB. The battery-supplied power of an active RFID tag generally gives it a longer read range, but this greater range comes at the cost if its size, cost, and limited operational life. Depending on operating temperatures and battery type, currently available active RFID tags may last up 10 years.

Passive RFID tags operate without a separate external power source and obtain operating power generated from the electromagnetic force of the RFID interrogator 103. Passive tags are lighter than active tags, less expensive, and offer a virtually unlimited operational lifetime, but have shorter read ranges and require a higher-powered RFID interrogator. Read-only passive RFID tags are programmed with a unique set of data (usually 32 to 128 bits) that cannot be modified. Read-only RFID tags typically correspond to additional, more comprehensive data in a database, much in the same manner as a linear barcode references a database containing additional information about the product containing the barcode.

The preferred embodiment of the present system includes a RFID reader or interrogator 103 that is packaged with a transceiver, a decoder and an antenna. Depending upon its power output and the radio frequency used, the interrogator 103 emits radio waves in ranges of anywhere from one inch to 100 feet or more. The electromagnetic field produced by the antenna can be turned on or off or left on, such as when it is necessary to continually scan multiple RFID tags 104. If constant interrogation is not required, the electromagnetic field could also be activated by a sensor device.

When a RFID tag 104 comes into contact with the electromagnetic field generated by the interrogator 103, the RFID tag 104 detects the interrogator's activation signal and responds accordingly with a separate signal generated by the RFID tag 104 containing data stored in the RFID tag's integrated circuit. In the absence of an integrated circuit, the RFID tag could include a simple coil that causes a change in the activation signal's wave pattern, which in turn could be detected by the interrogator 103. The interrogator 103 decodes the data provided by the RFID tag 104 and passes that data to a host computer for processing, such as CPU 105, which determines the course of action that must be taken with respect to the corresponding part 100. CPU 105 is further described below with respect to FIG. 3.

Each vehicle 102 could include multiple RFID interrogators 103 located at different points throughout the vehicle, depending on the location of each RFID tag 104 and the strength and frequency of the radio signals utilized by the RFID interrogator 103 to communicate with each RFID tag 104. In fact, each part could include multiple RFID tags 104, as further explained below, depending on the amount of data that needed to be associated with that part. The RFID interrogators 103 could be hardwire, or wirelessly, connected to the CPU 105.

A RFID interrogator 103 with a low-frequency range (30 KHz to 500 KHz) will have a shorter reading range, but cost less. High-frequency interrogators (850 MHz to 950 MHz and 2.4 GHz to 2.5 GHz) offer long read ranges (greater than 90 feet) and higher reading speeds, but cost substantially more than lower frequency systems. As noted above, each RFID interrogator includes an antenna that emits the radio signals that activate the RFID tag, and depending on the type of RFID tag utilized, reads and/or writes data to it. The antenna could be integral to the RFID interrogator 103, or external. Either way, antennas are available in a variety of shapes and sizes and could be located in a variety of different places, such as panel bodies, the undercarriage, door frames, etc.

RFID interrogators 103 are available from multiple vendors, and like the RFID tags 104, care must be taken to choose a unit that is appropriately resistant to the hostile environment in which it will operate. The RFID interrogators 103 must be able to receive signals from RFID tags 104 on parts 100 anywhere on the vehicle 102 without interference from nearby vehicles or other electrical systems of the vehicle 102.

In order to verify that each RFID interrogator 103 is able to communicate with the CPU 105, a special RFID tag 106 is placed near each RFID interrogator 103 to facilitate its testing. The tag 106 also contains chassis information about the vehicle 102 that enables the PVS to maintain vehicle integrity during testing. Chassis information can also be used to detect potential overlap with other vehicles.

Figure 2:
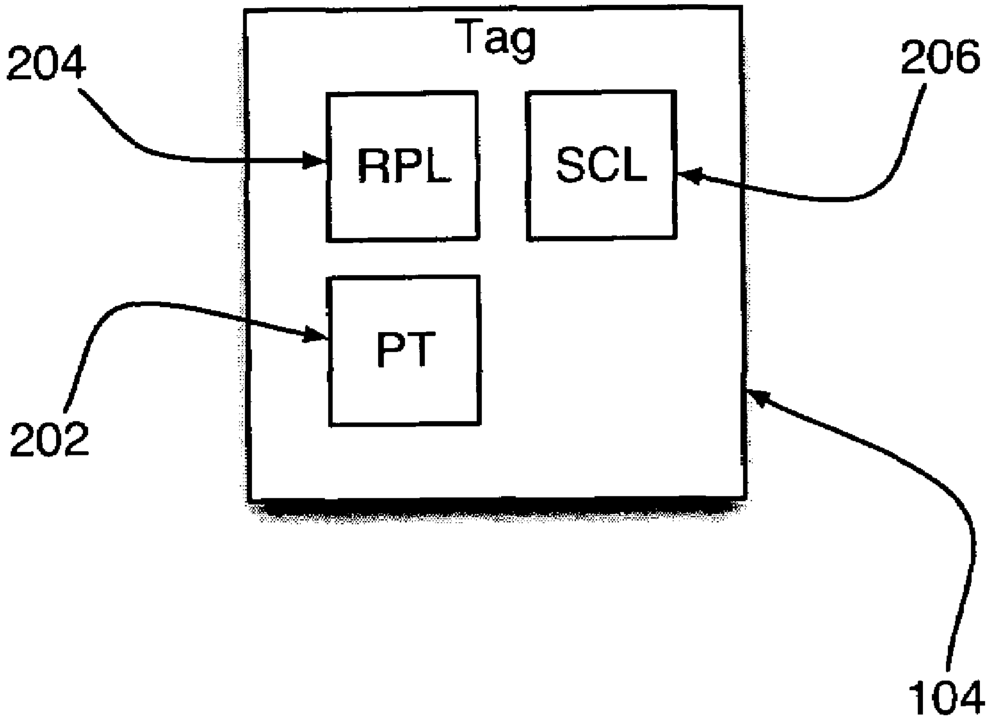
FIG. 2 is a block diagram illustrating the RFID tag of FIG. 1.

Referring now to FIG. 2, the RFID tag 104 is further illustrated as including a number of separate data modules. A data module could be a separate portion of a single data store or memory, a separate memory within a single RFID tag, or even a separate RFID tag. For example, if more data is required to be stored in association with a part 100 than can be stored on a single RFID tag 104, then it may be necessary to apply more than one RFID tag 104 to that part 100. As the storage capacity of RFID tags increase in the future, it may be possible to store larger and larger amounts of data within a single RFID tag, and to segment that data so that different portions of the data could be read or written when desired by the PVS system. For purposes of describing the preferred embodiment of the present invention, RFID tag 104 will be illustrated as being capable of containing multiple data modules.

A first data module, Part Tuple (PT) 202 is encoded with at least a unique serial number. Each part 100 must be guaranteed to be unique from any other similar part 100 and from all other RFID tagged parts 100 on the vehicle 102, or else the system may falsely determine that the part 100 is the wrong part or has not been changed when it should have been changed. The PT 202 may also contain other important elements such as: (1) a Manufacturer ID (MID—a universally-unique ID assigned to the Manufacturer by an agreed upon central authority—such as the UCC, who assigns UPCs, or the body that assigns EAN manufacturer codes); (2) a Universal Part ID (a number agreed upon by a central authority that describes the function being performed by a part, such as a particular size of air filter or fuel filter—often these can be directly taken from existing vehicle standards bodies); (3) a Manufacturer Part Number (MPN—assigned by the manufacturer to denote a particular part—a manufacturer may have a standard and premium part that serve the same basic purpose, but have different design goals); and (4) a Manufacturer Part Revision (MPR—mainly used to distinguish incremental changes in part design and production). The part tuple 202 may also include Part Build Data, which is manufacturer-specific data regarding when the part was built, including a date code and a manufacturing facility code. The part tuple 202 may further include Part Use-By Date, which is a specified date by when a part with a limited shelf-life should be utilized. Table 1 illustrates the different types of elements contained by part tuple 202 and some of the characteristics of such elements.

TABLE 1

| Part Tuple (PT) | |
|---|---|
| Serial Number | Must be unique to part 100 |
| Manufacturer ID | Must be unique to manufacturer |
| Universal Part ID | May be standard for a type of part 100 |
| Manufacturer Part Number | May be unique to manufacturer |
| Manufacturer Part Revision | May be unique to type of part |
| Part Build Data | (optional) Manufacturer-specific build information, including date code and facility code |
| Part use-by Date | (optional) Use-by date for part, denoting shelf-life before use |

The RFID tag 104 may also contain a Replacement Part List 204 (RPL). RPL 204 would typically include data necessary to manage the exchange or replacement of parts 100 on vehicle 102, but include some of the data in PT 202 if the RPL 204 is stored in a separate RFID 104 from the PT 202. The unique data included in RPL 204 could include a Change Failure Interval and a Change Warning Interval. The Change Failure Interval (CFI) denotes the expected useful life of a particular part 100. The Change Warning Interval serves to alert the operator of the vehicle 102 of an impending need to change a particular part 100 based on the CWI or the CFI. These intervals may be expressed and measured in terms of a variety of indicators available to the CPU 105. These include: elapsed time, engine run time, mileage, mass flow of fluids through a filter, particle collection rates, etc., and in the future, many other indicators may be available. Multiple Intervals may be in the table and in the case of more than one interval, each interval is examined separately. Table 2 illustrates the different types of elements that could be contained by part RPL 204 and some of the characteristics of such elements.

TABLE 2

| Replacement Part List (RPL) | |
|---|---|
| Manufacturer ID | May be referenced to previous entry |
| Manufacturer Part Number | May be referenced to previous entry |
| Manufacturer Part Revision | May be referenced to previous entry |
| Change Failure Interval(s) | Optionally present |
| Change Warning Interval | Must be present if CFI is present |

The RFID tag 104 could also include a standards compliance list 206, which is a list of standards requirements that are complied with by the part 100 and which are checked against a standards requirements list in the Required Parts Table, as further discussed below.

Figure 3:
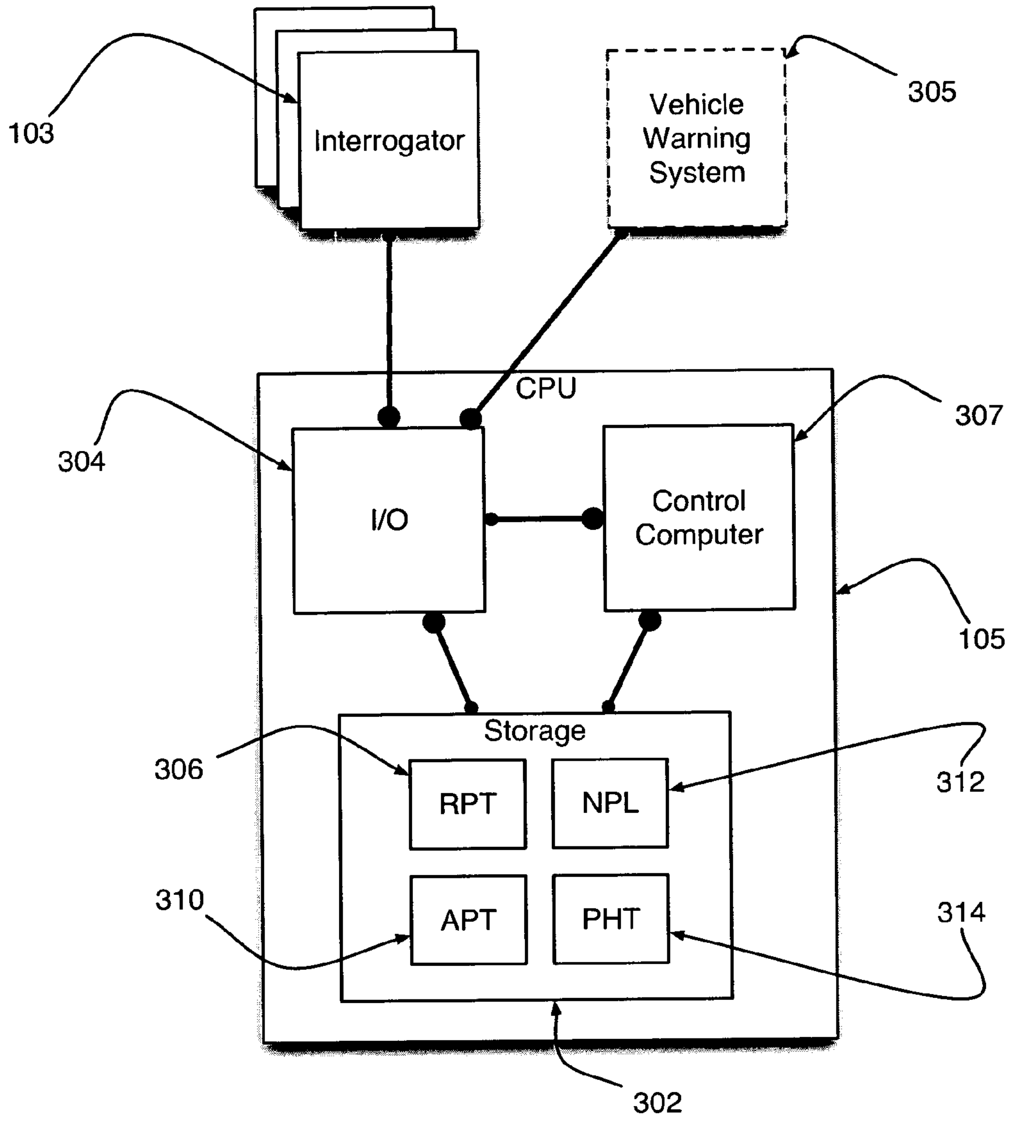
FIG. 3 is a block diagram illustrating the CPU of FIG. 1.

Referring now to FIG. 3, the central processor unit 105 is further illustrated. CPU 105, a critical portion of the PVS system, could be configured as a stand-alone device or as a portion of a device already incorporated into the vehicle 102, such as the vehicle's existing on-board computer. An existing on-board computer, which provides the logic and an interface to other electrical systems in the vehicle 102, as well as non-volatile memory for storage of parts information (including the APT, described below), would be an ideal CPU 105. CPU 105 includes a data storage 302 and I/O components 304 that communicate with the storage 302, the RFID interrogators 103, and any operator warning and vehicle inhibition systems provided by the vehicle's manufacturer.

CPU 105 also contains the Required Parts Table (RPT) 306. The RPT 306 provides a list of the parts 100 that are required by the manufacturer of a particular vehicle 102 to be present in the vehicle 102 and the specifications that those parts 100 must meet. The RPT 306 could be stored in either ROM or Flash ROM, as part of storage 302, or as part of a separate memory of the CPU 105. ROM would be used in most cases, especially if the parts tables are not expected to change, and the latter if the manufacturer is likely to provide updates at some point in the future. Table 3 illustrates the various data fields and their attributes in the RPT 306.

TABLE 3

| Required Parts Table (RPT) | |
|---|---|
| System Part ID | |
| Quantity Required | |
| Universal Part ID | |
| Standards Requirement(s) List | (Standard, OR/AND) |
| Change Warning Interval (s) | Percentage of CFI that causes warning |
| Change Failure Interval (s) | |
| Warning signal | |
| Failure signal | |
| Missing signal | |
| Acceptable Vendor Authenticator List | (MID, Vendor Key) |
| Acceptable Part List | (MID, MPN, minimum MPR) |

The RPT 306 may contain eleven or more relevant fields for each part 100, including the System Part ID, which is a code unique to each particular part 100 in the list of parts. The RPT 306 also has a field for the quantity of the particular part 100 required to be present in the vehicle 102. The RPT 306 contains a Universal Part ID, as discussed above in the context of the PT 202. The RPT 306 has a standards requirement(s) field for each part 100. The standards requirements field provides a mechanism for describing a part by its function and requirements, as opposed to by a particular manufacturer and part identification. Thus, if the Universal Part ID provides an indication of what parts will fit within a vehicle 102 (as in a specific size air filter), the standards requirements could be used to further determine the suitability of a part 100 by providing a maximum particle size for particles that can escape the filter. In this way, manufacturers may code a vehicle 102 for being able to accept a variety of parts from various manufacturers without losing the ability to use the system for automatic notification. Any part that meets the standards requirement (and whose manufacturer complies with the RFID requirements for detailing those standards) may be used in the vehicle 102. Importantly, the RPT 306 also contains the Change Warning Interval and the Change Failure Interval.

The RPT 306 also contains a warning signal, a failure signal, and a missing part signal, which determine the severity and type of warning that are given in the event that a particular part 100 is in a warning or failure state, or if the part is missing, respectively. Examples of the different types of signals that can be communicated to the vehicle warning system 305 include: a specific warning light, the ID of a specific message to be displayed to the user or code to be stored in the computer, or (in the case of failure or missing signals) an assertion to the control computer 307 of the CPU 105 that the vehicle may not be safe to operate. If a critical part of the vehicle is missing, the control computer 307 might disable the vehicle, for example, by communicating a kill signal through the I/O 304 to the electronic ignition for the vehicle. Likewise, the vehicle could be disabled if someone attempted to start the vehicle without an ignition key containing a tag 104 corresponding to the RPT 306.

Additionally, the RPT 306 includes an Acceptable Vendor Authenticator List (AVAL), which is a combination of the manufacturer's identification and a vendor key. The vendor key is used to authenticate the Replacement Parts List 204 (RPL) for a RFID tag 104 that uses this list to override replacement part identification. In other words, even though the RPL might require a part 100 to meet certain criteria to be acceptably used in the vehicle 100, the original manufacturer of the vehicle could use the AVAL in order to update or override those criteria so as to have a new or different type of part accepted by the PVS.

Finally, the RPT 306 includes an Acceptable Part List (APL), which contains all of the acceptable parts that can used as a substitute for a particular part 100. These two lists, the APL and the AVAL, if present, give specific instructions to the CPU 105 as to which manufacturer's parts are allowed (in the case of the AVAL) and which particular parts may be substituted (in the case of the APL). An example of the use of this system may be to require that only official parts from the original manufacturer or an approved manufacturer may be used to replace a specialized sensor. Another use might provide for standard or snow tires both meeting the necessary requirements.

Referring now to Table 4, the Active Parts Table (APT) 310 shown in FIG. 3 will be described. The APT is a list of the parts that are currently known to be in the vehicle 102. The APT 310 maintains information about each specific monitored part and information about the introduction of that part into the system. The APT 310 must be stored in a re-writable memory, as it will be necessary to update the values when a part is modified or replaced.

TABLE 4

| Active Parts Table (APT) | |
|---|---|
| System Part ID | Matches Required Parts Table |
| Part Tuple | |
| Serial Number | |
| Manufacturer ID | |
| Universal Part ID | |
| Manufacturer Part Number | |
| Manufacturer Part Revision | |
| Change Warning interval (s) | |
| Change Failure interval(s) | |
| Installation Datestamp | |
| Installation Mark | |
| Last Seen Datestamp | |
| Status | Present, Unseen, Warning, Failure |

The APT 310 has many of the elements present in the RPT 306 and the PT 202, but also includes an installation datestamp, which denotes the date and time the part 100 was installed in the vehicle 102. The APT 310 has a field for the installation mark and the last seen datestamp, which are used to store the marker information for the original installation (based on the parameters specified in the CFI and the date and time that the part was last seen by the PVS, respectively). The last field is the Status, which contains the presence and state of the part 100. The CPU also includes a New Parts List (NPL) 312, which is a list of new parts found in each vehicle unaccounted for in the APT 310, as further explained below with reference to FIG. 5A. The CPU also includes a Parts History Table (PHT) 314, which contains the PT from the newly accepted part along with the datestamp and interval(s) related to that part's wear.

Figure 4:
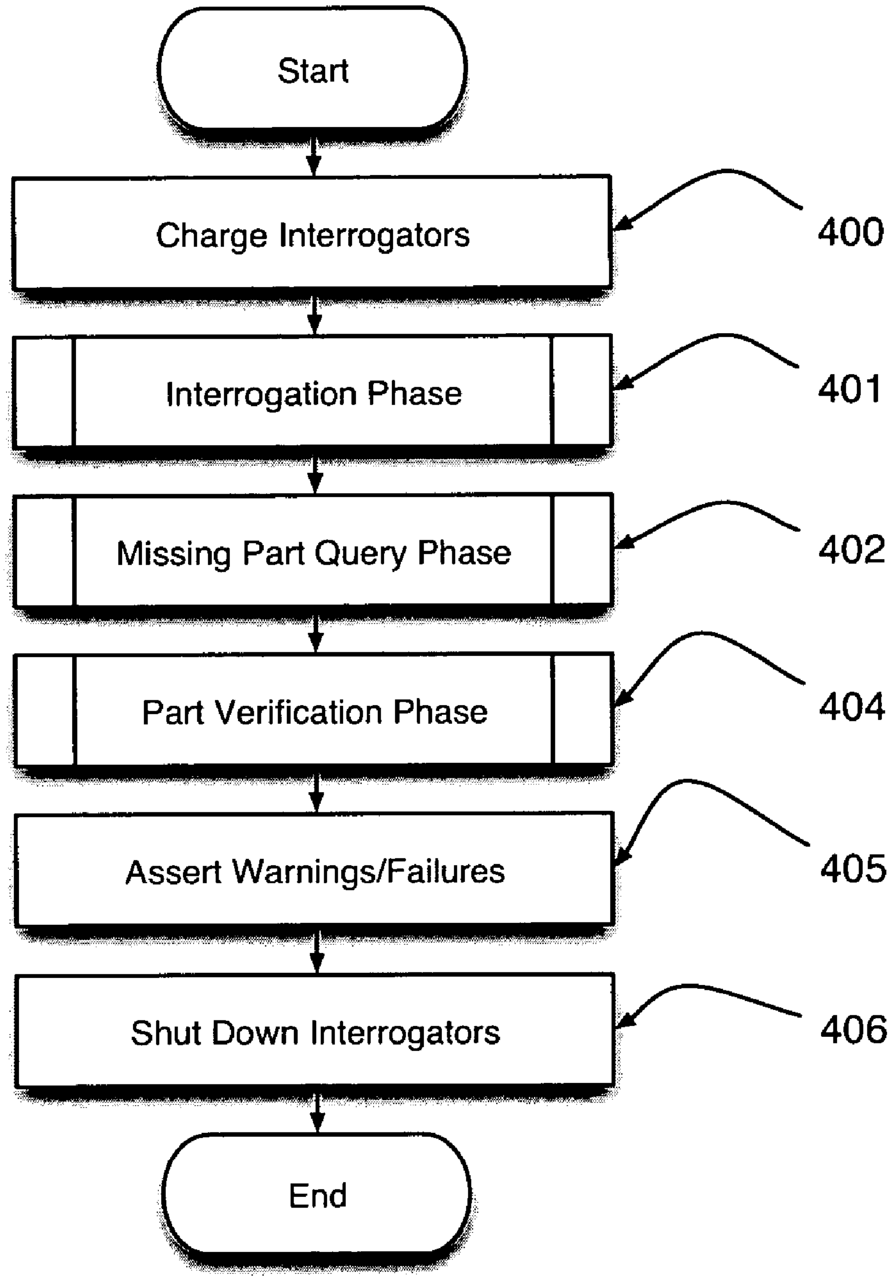
FIG. 4 is a flow diagram illustrating the overall operation of the Parts Verification System illustrated in FIG. 1 when the Parts Verification System is verifying the parts within a vehicle and processing the verification data.

Referring now to FIG. 4, the overall method for using the present invention will be illustrated. In step 400, the interrogators 103 are charged and activated for use in the system. Step 401 is the interrogation phase in which the interrogators 103 query the tags 104 to assess the data concerning the parts in the vehicle. After the interrogation phase, in step 402, the system enters the missing part query phase in which it determines if the vehicle 102 is missing any parts required by the RPT 306. Step 404 is the part verification phase in which all the parts are checked for authenticity of each part and its compliance with the specifications.

Based on these previous steps, the system asserts failure and warning signals based on the information gathered from the tags 104 by the interrogators 103 in step 405. In step 406, the interrogators 103 are then shut down. These steps illustrate the overall system and overall function of the system in assessing information on the tags 104, determining the presence of vehicle parts and giving warnings based on the information concerning these parts.

Figure 5A:
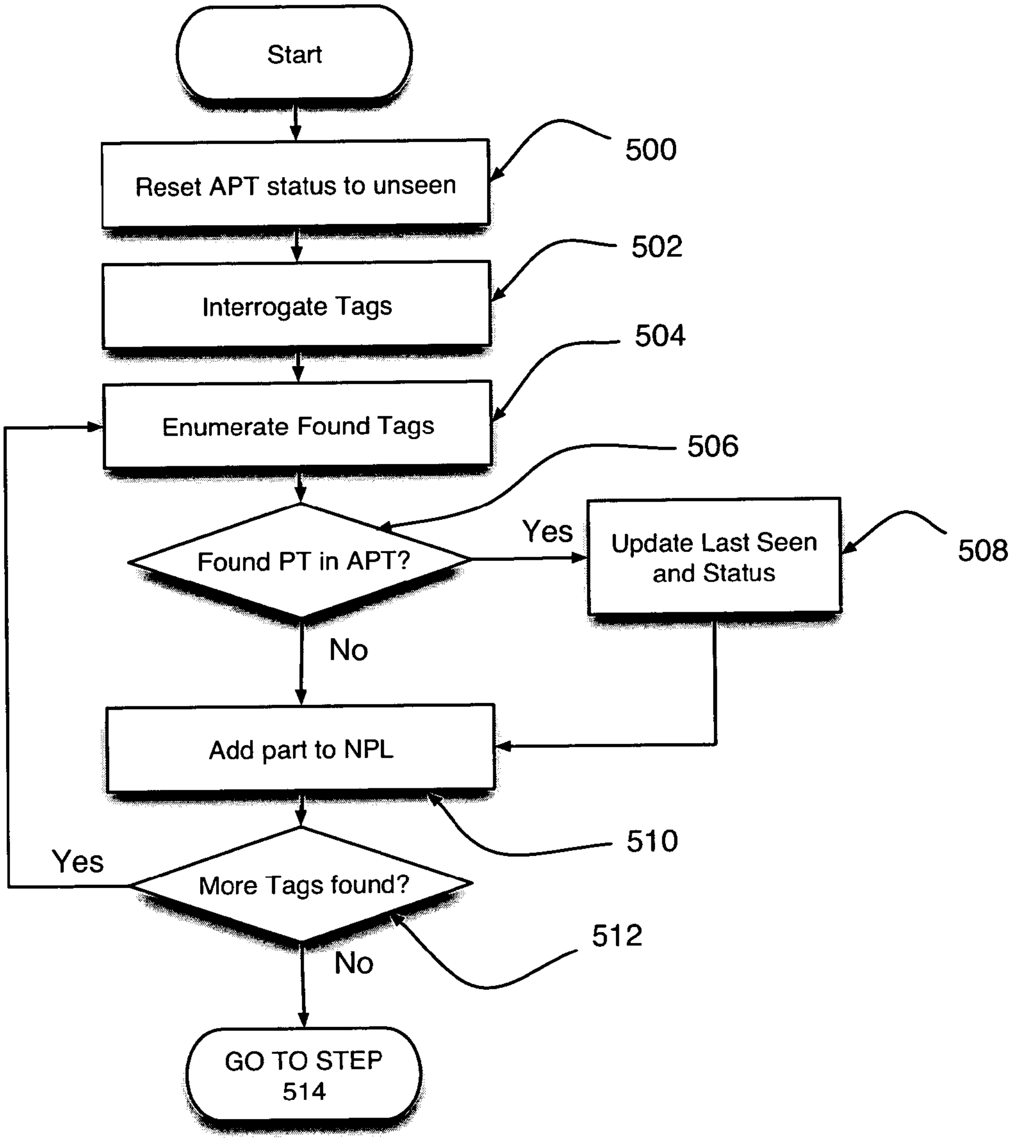
FIGS. 5A and 5B are flow diagrams further illustrating the interrogation and missing part query phases as illustrated in FIG. 4.
Figure 5B:
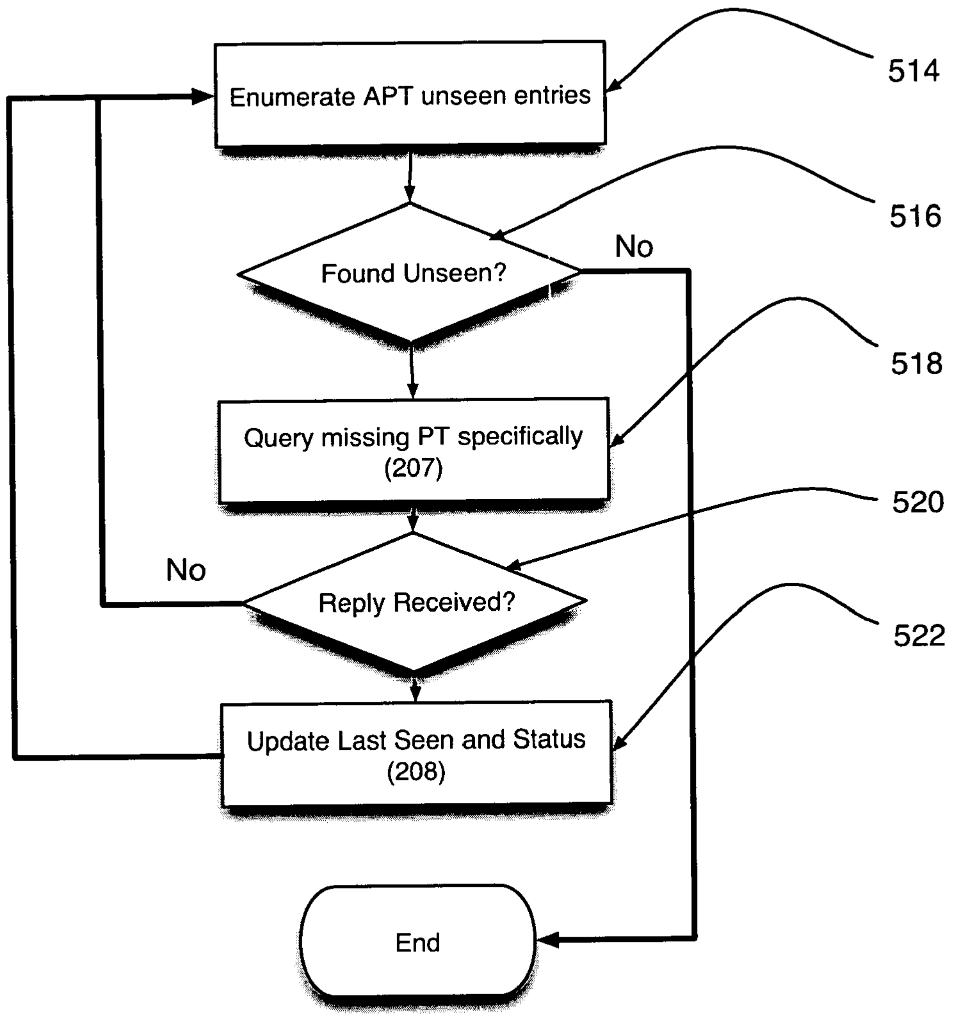

Referring now to FIGS. 5A and 5B, the interrogation/action phase of FIG. 1 will be described in greater detail. In step 500, upon initiation of the interrogation phase, the status of each entry in the APT 310 is set to Unseen. In step 502, all RFID tags 104 within the range of interrogators 103 are queried. A list of detected or found RFID tags 104, based on the data read from each PT 202, is the compiled in step 504.

In step 506, each PT 202 on the list of found tags is compared to the list of part tuples in the APT 310. A strict comparison of the PT 202 with part tuples data in the APT 310 is necessary to accurately verify the tag, the part and the manufacturer of that part. If an exact match is found between PT 202 and a part tuple in the APT 310, in step 508 the last-seen date stamp in the APT 310 for the corresponding tag 104 is updated with the current date stamp and the tag's status is changed to Present. In step 510, if a match is not found for the PT 202, the PT 202 data is added to the New Parts List (NPL) 312. In step 512, the process of attempting to match PT 202 data with APT 310 data continues until the status of each detected tag for a part is updated to Present, or the PT 202 data for that part is added to the NPL 312.

In step 514, a list of any entries in the APT 310 that are still undetected and therefore marked as Unseen is created. An entry in the APT 310 may continue to list a tag 104 as Unseen because that tag was missed during an interrogation due to network or signal interference problems, or because that tag has been damaged or removed, or because the part corresponding to that tag is missing or has been replaced with a part without a tag or the wrong tag. In step 516, if there are no Unseen entries in the APT 310, the interrogation phase is ended. If there are Unseen entries in the APT 310, in step 518, an interrogator 103 will be used in an attempt to elicit a response from a tag 104 for a part 100 that should be present, but which was missed in the initial query. In step 520, if a response is received from a directly interrogated tag 104, the last seen information and status are updated in step 522. If no response is received, the process of steps 514 through 520 are repeated until the status of all of the tags are updated to either Present or Failure. The status of a tag is changed to Failure if it cannot be detected after a certain number of attempts.

Figure 6:
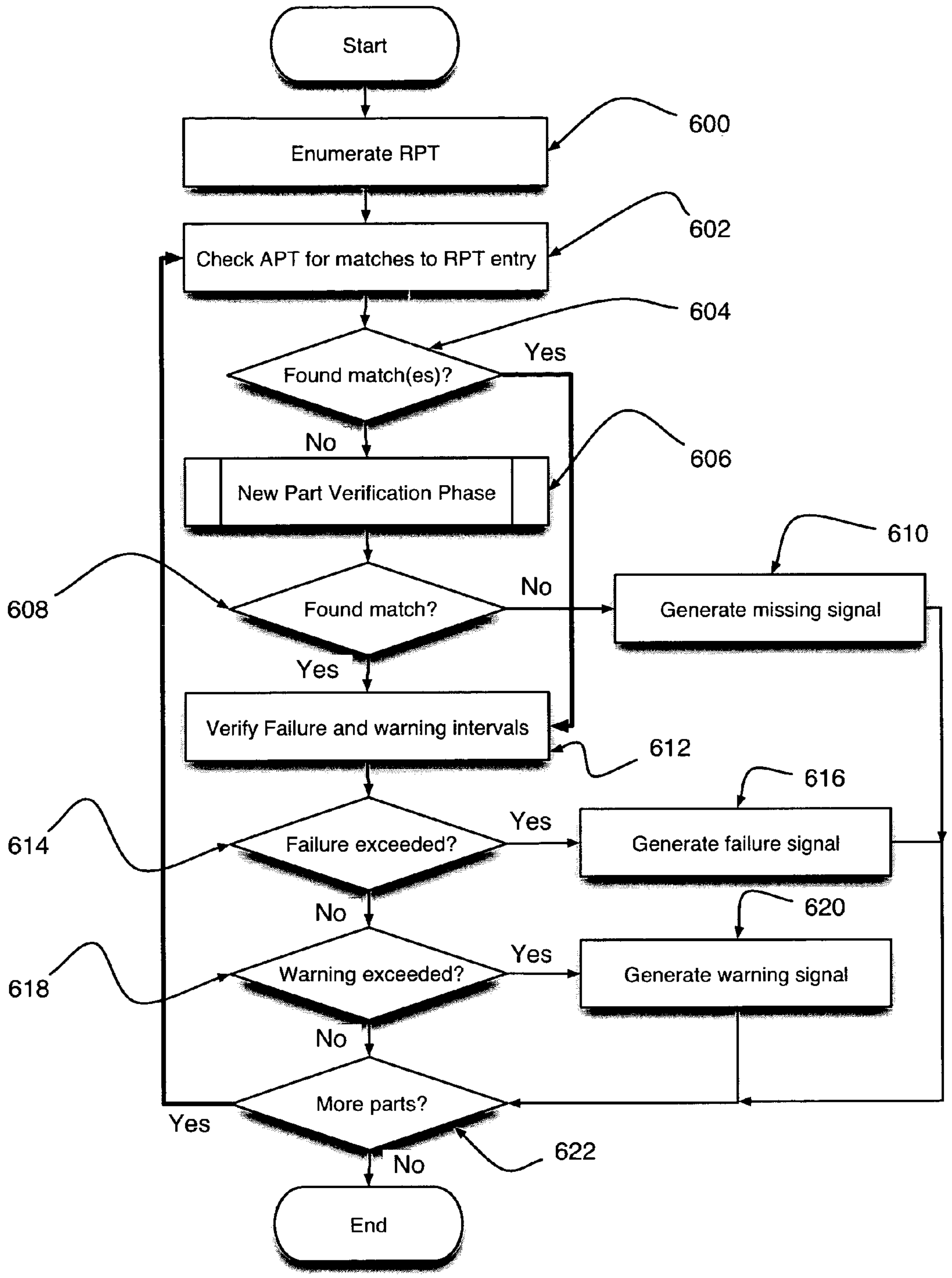
FIG. 6 is a flow diagram further illustrating the part verification phase and the process of asserting warnings and failures as illustrated in FIGS. 5A and 5B.

In FIG. 6, the process for handling damaged, missing or replaced parts, as well as generating warnings, in accordance with the preferred embodiment of the present invention is described in further detail. In step 600, the RPT 306 is listed. The RPT could be stored in the CPU 105, or could be accessed from a remote computer connected to the vehicle 102, such as those frequently used during vehicle maintenance or service. During step 602, each part listed in the RPT 306 is checked against the Present tags listed in the APT 310. In this way, the PVS is able to determine what parts in RPT 306 are in the APT 310. If the RPT 306 lists more than one part, multiple matches will be sought between the RPT 306 and the APT 310 during step 602.

In step 604, for each entry in the RPT 306 that has insufficient matching parts, a search is made of the New Parts List 312 to identify any parts 100 that might match using the New Parts Verification Process in step 606, which will be further explained below with respect to FIG. 7. If the search of the APT 310 fails to find a sufficient quantity of matching parts 100 to satisfy the RPT 306, step 608, then a missing signal is generated to the vehicle's computer system 105 in step 610. This will, in turn, be used to modify the vehicle's behavior, for example, though prevention of the start or ignition of the vehicle, through presentation of a warning message, or in some other manner.

If a matching part 100 is found, then the failure and warning intervals of the CFI are verified in step 612. In step 614, if any of the failure intervals have been exceeded then a failure signal is generated by the vehicle's computer system 105 in step 616. If each of the failure intervals has not been exceeded then, the warning signal is verified in step 618, and if any warning interval has been exceeded then a warning signal is generated in step 620. In step 622, if no warning interval has been exceeded, then the PVS seeks to determine if there are more parts, and if so, repeats steps 602 through 622 until all parts in the RPT 306 have been processed.

Figure 7:
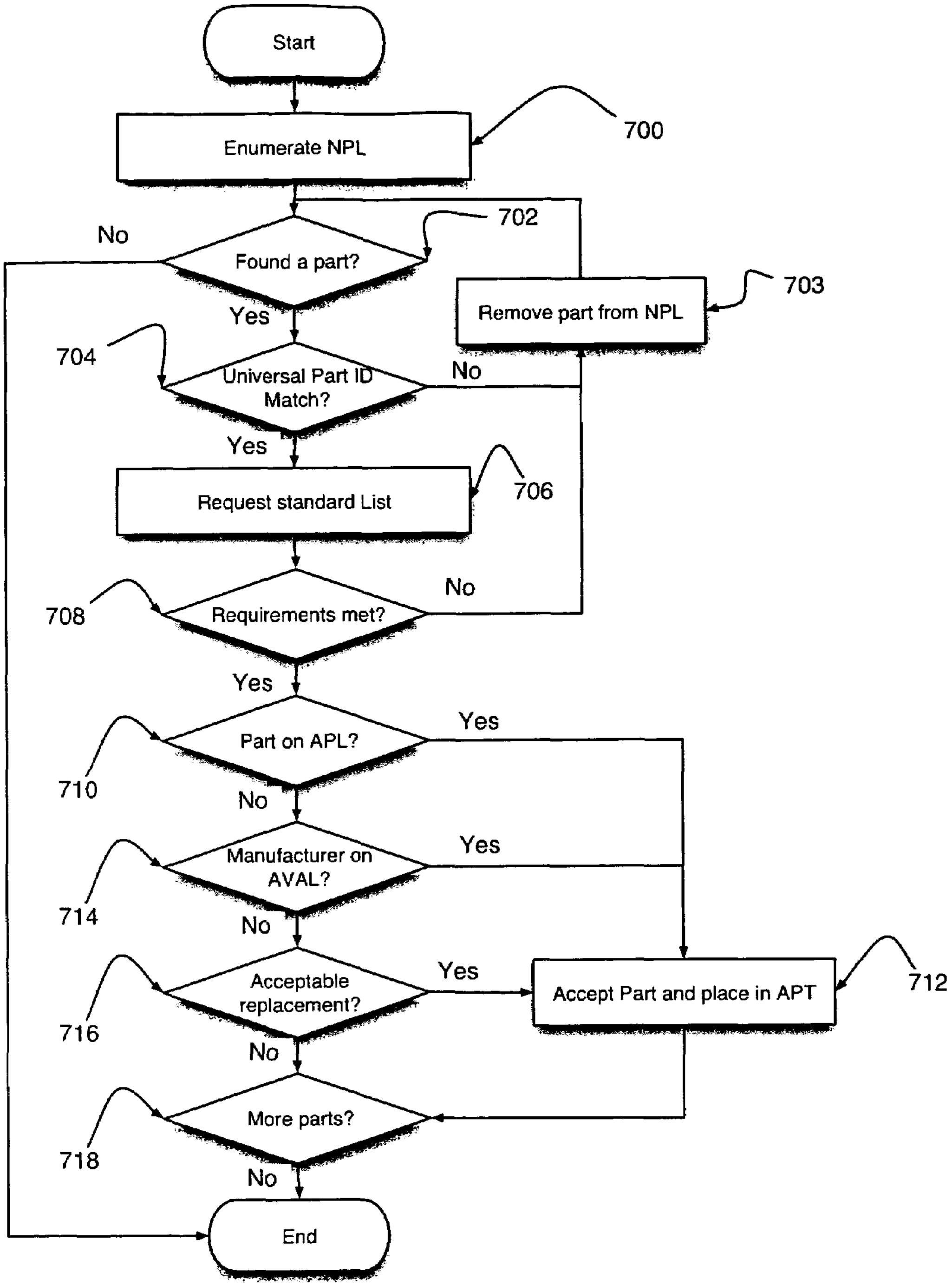
FIG. 7 is a flow diagram further illustrating the new part verification phase as illustrated in FIG. 6.

Referring now to FIG. 7, the New Parts Verification process, step 606 of FIG. 6, for determining if a vehicle has appropriate parts or replacement parts, is described in greater detail. When a new part 100 is detected as described above and in FIG. 5, a series of actions are taken to determine if the part 100 is a replacement part 100 or if there is another explanation for the new part 100, such as uninstalled part 100 present in the interior of the target vehicle 102 or another vehicle in close proximity to the target vehicle 102 whose parts are being identified as incorrectly belonging to the target vehicle 102. Because the effectiveness of the present invention requires that the Interrogators 103 are able to reach all parts 100 of the vehicle 102 that may be interrogated, the appropriate recognition of nearby parts 100 will enable longer-range sensors to be used without fear of misdetection. This process will reduce the costs of using sensors at the installation point of each part.

However, such a strategy increases the likelihood of vehicle overlap, which will have to be detected through the use of the previously mentioned Vehicle ID and the mechanisms described for replacement part detection. When a new part 100 is to be processed, the system performs a series of tests to determine if a part is acceptable. First, in step 700, the NPL 312 is enumerated. If a new part is found, under step 702, the new part 100 is checked against the Universal Part ID, step 704. If the part 100 does not match that Universal Part ID, the part 100 is removed from the NPL, step 703, and the next part 100 is looked at. In step 706 the standards requirements list is verified. If the RPT 306 does not contain a standards requirements list, this check can be skipped. If the standards requirements list is required, a Standards Inquiry is made to the part 100, retrieving the standards for the part 100 from its tag 104 so that the standards can be verified. Once the Standards Inquiry is made, the standards for each part are tested against each other in step 708. Success is determined when each of the standards requirements from the RPT 306 is present in the new part. If the standards compliance list 206 for a part does not match the standards requirements list for such parts, then the part 100 is removed from the NPL and the next part 100 is investigated.

If the part 100 is on the Acceptable Part List, step 710, and meets the appropriate criteria, the test is complete and the part 100 is added, step 712, to the APT 310 as the match for the System Part ID it is being tested. Upon acceptance, each part may be recorded in the Parts History Table (PHT) 314. Each entry in the Acceptable Part List (APL) is checked for a successful comparison. To match successfully, the MID for the part must be equal to the MID on the APL, the MPN for the part must be equal to the MPN on the APL (if not empty in the RPT 306), and the MPR must be the same or less than the MPR of the part 100. If the MPR of the part is greater than the required MPR, the part's APL may contain a new CFI and CWI pair, which should be heeded.

Finally, in step 714, the AVAL is searched for an MID that matches the MID of the new part 100. If a matching entry is found, a Replacement Part Query is made to the part from the Interrogator 103. The response to the Replacement Part Query is the Replacement Part List with a well-known sequence (called a checkword) appended to it, which is encrypted with the private key from the Vendor. As a part of step 716, the response is decrypted using the public key for the Vendor as stored in the AVAL and the result of the decryption is considered a valid RPL if the checkword, as decrypted, is equal to the well-known sequence for the checkword. If the value is different, the RPL is ignored as bad data. If the checkword is correct, step 716, the RPL is accurate and may be used. Each entry in the RPL in the Replacement Part Query, step 718, is then tested against the APL in the same way that the previous parts list test was performed.

The present invention is quite useful for vehicle fleet owners in that the information obtained by the system may be output using RF or cable connections so that details of all parts currently active on a vehicle, as well as the expiration information will be available to the fleet operator, thereby using the vehicle itself as the storage mechanism for fleet data. At appropriate intervals (turn-in for rental cars, daily for aircraft), the vehicle may be scanned or connected to upload the pertinent data and appropriate maintenance may be performed.

Moreover, with the growing use of RFID systems for tracking inventory, the PVS (described above) can be used with an inventory management system to track parts from their purchase through installation, and into expiration. This will mean that an individual part and batch can be monitored for excess wear or failure and that it will be easy to identify which parts come from the same batch in the event of a recall.

Further, organizations such as repair depots can use the RFID tags to verify that all parts have been appropriately inventoried prior to returning the customer's vehicle to them, thus insuring that the customer pays for all parts that have been replaced and installed (or that the vehicle's warrantee service company pays for the parts).

Following on the same lines, the customer is assured of both the authenticity of the parts and their replacement since any equipped repair depot (or dealer) would be able to verify the part's lineage and age, and the vehicle itself will be able to provide information on the installation date and time. For example, if maintenance was not appropriately performed the vehicle owner will be warned because the warning dash lights will no longer simply be reset by a technician pressing a button, instead it will require the replacement of the offending part with an appropriate replacement.

One additional use of the technology is as a parts verification mechanism for new and used vehicles. Often, when vehicles are purchased, a cursory check is made of the vehicle to confirm that the parts are all from the original vehicle. In a new vehicle, this should always be the case. For a used vehicle, some parts may be used and will have variable remaining lives. Since the system will be able to provide an accurate parts inventory and parts life information, purchasers could use this mechanism to verify that the vehicle they are purchasing is truthfully represented by the seller.

The invention claimed is:

1. A verification system for parts of a structure, comprising:

a plurality of radio frequency identification tags affixed to one or more parts of said structure, each of said tags being operative to store unique data regarding an associated part and to issue said unique data in response to a radio frequency signal;

a transceiver operative to generate said radio frequency signal and to receive said unique data issued from one or more detected tags;

an antenna operative to communicate said radio frequency signals to said tags and said unique data to said transceiver; and a central processor operative to receive said unique data from said transceiver and to utilize said unique data to verify that said associated part is present on said structure, said central processor including a controller, a data storage in communication with said controller, and an input/output for communicating between said controller, said data storage and said transceiver;

wherein said data storage includes a list of active tags affixed to said parts of said structure, said list of active tags including a serial number unique to each of said tags, a manufacturer identification unique to the manufacture of said associated part, and a part identification unique to a type of part that includes the associated part, wherein said list of active tags includes said serial number, said manufacture identification and said part identification for some of said detected tags, and wherein controller is operative to match said serial number, said manufacture identification and said part identification from each of said detected tags against said list of active tags to determine if any of said active tags are missing from said structure;

wherein said data storage further includes a list of new parts that correspond to said detected tags not listed on said list of active tags, wherein said controller is operative to include one of said detected tags on said list of new parts if said serial number, said manufacture identification and said part identification included within said unique data for each of said detected tags does not match each of said serial number, said manufacture identification and said part identification included within said list of active tags, wherein said data storage further includes a list of acceptable parts, and wherein said controller is further operative to move said detected tags from said list of new parts to said list of active tags if said unique data for said detected tags on said list of new parts matches data on said list of acceptable parts.

2. A verification system for parts of a structure, comprising:

a plurality of radio frequency identification tags affixed to one or more parts of said structure, each of said tags being operative to store unique data regarding an associated part and to issue said unique data in response to a radio frequency signal;

a transceiver operative to generate said radio frequency signal and to receive said unique data issued from one or more detected tags;

an antenna operative to communicate said radio frequency signals to said tags and said unique data to said transceiver; and a central processor operative to receive said unique data from said transceiver and to utilize said unique data to verify that said associated part is present on said structure, said central processor including a controller, a data storage in communication with said controller, and an input/output for communicating between said controller, said data storage and said transceiver;

wherein said unique data of some of said tags associated with replaceable parts includes one or more change indicators that identifies when one or more of said replaceable parts is missing, has been replaced or should be replaced, wherein said data storage includes one or more change indicator warning fields, and wherein said controller is operative to issue a warning signal when one of said change indicators matches one of said change indicator warning fields;

wherein said controller is operative to disable said structure in response to said warning signal.

3. A verification system for parts of a structure, comprising:

a plurality of radio frequency identification tags affixed to one or more parts of said structure, each of said tags being operative to store unique data regarding an associated part and to issue said unique data in response to a radio frequency signal;

a transceiver operative to generate said radio frequency signal and to receive said unique data issued from one or more detected tags;

an antenna operative to communicate said radio frequency signals to said tags and said unique data to said transceiver; and a central processor operative to receive said unique data from said transceiver and to utilize said unique data to verify that said associated part is present on said structure, said central processor including a controller, a data storage in communication with said controller, and an input/output for communicating between said controller, said data storage and said transceiver;

wherein said unique data of some of said tags associated with replaceable parts includes one or more change indicators that identifies when one or more of said replaceable parts is missing, has been replaced or should be replaced, wherein said data storage includes one or more change indicator warning fields, and wherein said controller is operative to issue a warning signal when one of said change indicators matches one of said change indicator warning fields; wherein said controller is operative to indicate to an operator of said structure that one of said replaceable parts needs to be replaced.

4. A verification system for parts of a structure, comprising:

a plurality of radio frequency identification tags affixed to one or more parts of said structure, each of said tags being operative to store unique data regarding an associated part and to issue said unique data in response to a radio frequency signal;

a transceiver operative to generate said radio frequency signal and to receive said unique data issued from one or more detected tags;

an antenna operative to communicate said radio frequency signals to said tags and said unique data to said transceiver; and a central processor operative to receive said unique data from said transceiver and to utilize said unique data to verify that said associated part is present on said structure, said central processor including a controller, a data storage in communication with said controller, and an input/output for communicating between said controller, said data storage and said transceiver;

wherein said unique data of some of said tags associated with replaceable parts includes one or more change indicators that identifies when one or more of said replaceable parts is missing, has been replaced or should be replaced, wherein said data storage includes one or more change indicator warning fields, and wherein said controller is operative to issue a warning signal when one of said change indicators matches one of said change indicator warning fields;

wherein said unique data of some of said tags associated with replaceable parts includes a change code that is operative to override one or more said change indicators.

5. A verification system for parts of a structure, comprising:

a plurality of radio frequency identification tags affixed to one or more parts of said structure, each of said tags being operative to store unique data regarding an associated part and to issue said unique data in response to a radio frequency signal;

a transceiver operative to generate said radio frequency signal and to receive said unique data issued from one or more detected tags;

an antenna operative to communicate said radio frequency signals to said tags and said unique data to said transceiver; and a central processor operative to receive said unique data from said transceiver and to utilize said unique data to verify that said associated part is present on said structure, said central processor including a controller, a data storage in communication with said controller, and an input/output for communicating between said controller, said data storage and said transceiver;

wherein said unique data of some of said tags associated with some of said parts includes a use-by date and wherein said controller is operative to issue a warning signal when a use-by date has been exceeded.

6. A verification system for parts of a structure, comprising:

a plurality of radio frequency identification tags affixed to one or more parts of said structure, each of said tags being operative to store unique data regarding an associated part and to issue said unique data in response to a radio frequency signal;

a transceiver operative to generate said radio frequency signal and to receive said unique data issued from one or more detected tags;

an antenna operative to communicate said radio frequency signals to said tags and said unique data to said transceiver; and a central processor operative to receive said unique data from said transceiver and to utilize said unique data to verify that said associated part is present on said structure, said central processor including a controller, a data storage in communication with said controller, and an input/output for communicating between said controller, said data storage and said transceiver;

wherein said data storage includes a list of active tags affixed to said parts of said structure and a list of required parts for said structure, each of said active tags being among said detected tags, and wherein said controller is operative to match said list of active tags against said list of required parts to verify that each of said parts is present on said structure;

wherein said controller is operative to issue one or more missing part signals when said list of active tags does not match said list of required parts;

wherein said controller is operative to disable said structure in response to said missing part signal.

7. A verification system for parts of a structure, comprising:

a plurality of radio frequency identification tags affixed to one or more parts of said structure, each of said tags being operative to store unique data regarding an associated part and to issue said unique data in response to a radio frequency signal;

a transceiver operative to generate said radio frequency signal and to receive said unique data issued from one or more detected tags;

an antenna operative to communicate said radio frequency signals to said tags and said unique data to said transceiver; and a central processor operative to receive said unique data from said transceiver and to utilize said unique data to verify that said associated part is present on said structure, said central processor including a controller, a data storage in communication with said controller, and an input/output for communicating between said controller, said data storage and said transceiver;

wherein said unique data of some of said tags associated with replaceable parts includes one or more change indicators that identifies when one or more of said replaceable parts should be replaced, wherein said data storage includes one or more worn part indicators, and wherein said controller is operative to issue a warning signal when one of said change indicators matches one of said worn part indicators.

8. A verification system for parts of a structure, comprising:

a plurality of radio frequency identification tags affixed to one or more parts of said structure, each of said tags being operative to store unique data regarding an associated part and to issue said unique data in response to a radio frequency signal;

a transceiver operative to generate said radio frequency signal and to receive said unique data issued from one or more detected tags;

an antenna operative to communicate said radio frequency signals to said tags and said unique data to said transceiver; and a central processor operative to receive said unique data from said transceiver and to utilize said unique data to verify that said associated part is present on said structure, said central processor including a controller, a data storage in communication with said controller, and an input/output for communicating between said controller, said data storage and said transceiver;

wherein said unique data of some of said tags associated with replaceable parts includes one or more change indicators that identifies when one or more of said replaceable parts has been replaced with a new part, wherein said data storage includes one or more new part indicators, and wherein said controller is operative to verify the acceptability of new parts in response to said new part indicators.

9. A verification system for parts of a structure, comprising:

a plurality of radio frequency identification tags affixed to one or more parts of said structure, each of said tags being operative to store unique data regarding an associated part and to issue said unique data in response to a radio frequency signal;

a transceiver operative to generate said radio frequency signal and to receive said unique data issued from one or more detected tags;

an antenna operative to communicate said radio frequency signals to said tags and said unique data to said transceiver; and a central processor operative to receive said unique data from said transceiver and to utilize said unique data to verify that said associated part is present on said structure, said central processor including a controller, a data storage in communication with said controller, and an input/output for communicating between said controller, said data storage and said transceiver;

wherein said structure is a vehicle, wherein one of said tags is affixed to an ignition key for said vehicle, and wherein said controller is operative to disable said vehicle if said unique data from said tag affixed to said ignition key is not received by said transceiver.

10. A method for verifying parts for a structure, comprising the steps of:

interrogating a plurality of radio frequency identification tags affixed to one or more parts of said structure to retrieve unique data stored within each of said tags;

creating a list of tags from which said unique data could be retrieved, wherein each of said tags corresponds to a part of said structure; and comparing said unique data from said tags on said list of tags against data on a pre-existing list of required parts to determine if all required parts for said structure are present;

wherein said unique data stored within some of said tags identifies one or more characteristics regarding the acceptable nature of a corresponding part, and wherein said steps further comprise the step of evaluating each present part to determine if said present part is an acceptable part according to said characteristics;

wherein said unique data stored with some of said tags includes a change code that is operative to override said characteristics.

11. A method for verifying parts for a structure, comprising the steps of:

interrogating a plurality of radio frequency identification tags affixed to one or more parts of said structure to retrieve unique data stored within each of said tags;

creating a list of tags from which said unique data could be retrieved, wherein each of said tags corresponds to a part of said structure; and comparing said unique data from said tags on said list of tags against data on a pre-existing list of required parts to determine if all required parts for said structure are present;

wherein said unique data stored within some of said tags identifies one or more characteristics regarding the acceptable nature of a corresponding part, and wherein said steps further comprise the step of evaluating each present part to determine if said present part is an acceptable part according to said characteristics;

wherein said characteristics include a use-by date.

12. A method for verifying parts for a structure, comprising the steps of:

interrogating a plurality of radio frequency identification tags affixed to one or more parts of said structure to retrieve unique data stored within each of said tags;

creating a list of tags from which said unique data could be retrieved, wherein each of said tags corresponds to a part of said structure; and comparing said unique data from said tags on said list of tags against data on a pre-existing list of required parts to determine if all required parts for said structure are present;

wherein said unique data stored within some of said tags includes a change warning interval for a corresponding part, and wherein said step of comparing said unique data from said tags includes the steps of:

comparing a current interval level against said change warning interval to determine if said change warning interval has been exceeded; and generating a warning indicator if said change warning interval has been exceeded.

13. A method for verifying parts for a structure, comprising the steps of:

interrogating a plurality of radio frequency identification tags affixed to one or more parts of said structure to retrieve unique data stored within each of said tags;

creating a list of tags from which said unique data could be retrieved, wherein each of said tags corresponds to a part of said structure; and comparing said unique data from said tags on said list of tags against data on a pre-existing list of required parts to determine if all required parts for said structure are present;

wherein said unique data stored within some of said tags includes a change warning interval for a corresponding part, and wherein said step of comparing said unique data from said tags includes the steps of:

comparing a current interval level against said change warning interval to determine if said change warning interval has been exceeded; and generating a warning indicator if said change warning interval has been exceeded;

wherein said unique data stored within some of said tags further includes a change failure interval for a corresponding part, and wherein said step of comparing said unique data from said tags further includes the steps of:

comparing a current interval level against said change failure interval to determine if said change failure interval has been exceeded; and generating a failure indicator if said change failure interval has been exceeded.

14. A method for verifying parts for a structure, comprising the steps of:

interrogating a plurality of radio frequency identification tags affixed to one or more parts of said structure to retrieve unique data stored within each of said tags;

creating a list of tags from which said unique data could be retrieved, wherein each of said tags corresponds to a part of said structure; and comparing said unique data from said tags on said list of tags against data on a pre-existing list of required parts to determine if all required parts for said structure are present;

wherein said unique data stored within some of said tags includes a change warning interval for a corresponding part, and wherein said step of comparing said unique data from said tags includes the steps of:

comparing a current interval level against said change warning interval to determine if said change warning interval has been exceeded; and generating a warning indicator if said change warning interval has been exceeded;

wherein said unique data stored within some of said tags further includes a change failure interval for a corresponding part, and wherein said step of comparing said unique data from said tags further includes the steps of:

comparing a current interval level against said change failure interval to determine if said change failure interval has been exceeded; and generating a failure indicator if said change failure interval has been exceeded; wherein said step of comparing said unique data from said tags further includes the step of disabling said structure if said change failure interval has been exceeded.

15. A verification system for parts of a structure, comprising:

a plurality of radio frequency identification tags affixed to one or more parts of said structure, each of said tags being operative to store unique data regarding an associated part and to issue said unique data in response to a radio frequency signal;

a transceiver operative to generate said radio frequency signal and to receive said unique data issued from one or more detected tags;

an antenna operative to communicate said radio frequency signals to said tags and said unique data to said transceiver; and a central processor operative to receive said unique data from said transceiver and to utilize said unique data to verify that said associated part is present on said structure, said central processor including a controller, a data storage in communication with said controller, and an input/output for communicating between said controller, said data storage and said transceiver;

further including a remote computer controller remotely located from said structure and operative to communicate with said central processor of said structure to exchange data with said data storage and to control the operation of said central processor; wherein said structure is a vehicle, wherein one of said tags is affixed to an ignition key for said vehicle, and wherein said steps further comprise the step of disabling said vehicle if said unique data from said tag affixed to said ignition key cannot be retrieved.

16. A method for verifying parts for a structure, comprising the steps of:

interrogating a plurality of radio frequency identification tags affixed to one or more parts of said structure to retrieve unique data stored within each of said tags;

creating a list of tags from which said unique data could be retrieved, wherein each of said tags corresponds to a part of said structure; and creating a list of pre-existing tags from which said unique data has previously been retrieved;

creating a list of new tags from which said unique data has not previously been retrieved, wherein said unique data stored within each of said new tags identifies one or more characteristics regarding the acceptable nature of a corresponding part;

evaluating said unique data from each new tag to determine if said corresponding part is an acceptable part according to said characteristics;

adding each new tag corresponding to an acceptable part to said list of tags;

comparing said unique data from said tags on said list of tags against data on a pre-existing list of required parts to determine if all required parts for said structure are present.

17. The method of claim 16, wherein said characteristics include a manufacture identification.

18. The method of claim 16, wherein said characteristics include a universal part identification.

19. The method of claim 16, wherein said characteristics include a manufacturer part number.

20. The method of claim 16, wherein said characteristics include a manufacturer part revision number.

21. The method of claim 16, wherein said characteristics include a standards compliance list identifying industry standards with which said corresponding part complies.

22. The method of claim 16, wherein said unique data stored with some of said tags includes a change code that is operative to override said characteristics.

23. The method of claim 16, wherein said characteristics include a use-by date.

24. The method of claim 16, wherein said unique data stored within some of said tags includes a change warning interval for a corresponding part, and wherein said step of comparing said unique data from said tags includes the steps of:

comparing a current interval level against said change warning interval to determine if said change warning interval has been exceeded; and generating a warning indicator if said change warning interval has been exceeded.

25. The method of claim 24, wherein said unique data stored within some of said tags further includes a change failure interval for a corresponding part, and wherein said step of comparing said unique data from said tags further includes the steps of:

comparing a current interval level against said change failure interval to determine if said change failure interval has been exceeded; and generating a failure indicator if said change failure interval has been exceeded.

26. The method of claim 25, wherein said step of comparing said unique data from said tags further includes the step of disabling said structure if said change failure interval has been exceeded.

27. The method of claim 16, wherein said structure is a vehicle, wherein one of said tags is affixed to an ignition key for said vehicle, and wherein said steps further comprise the step of disabling said vehicle if said unique data from said tag affixed to said ignition key cannot be retrieved.

* * * * *